US010978900B2

(12) United States Patent
Park et al.

(10) Patent No.: US 10,978,900 B2
(45) Date of Patent: Apr. 13, 2021

(54) AUXILIARY BATTERY CAPABLE OF TRANSMITTING AND RECEIVING WIRELESS POWER (71) Applicant: AMOSENSE CO., LTD, Chungcheongnam-do (KR)

(72) Inventors: Jun Ho Park, Seoul (KR); Jin Pyo Park, Seoul (KR); Bae Geun Lee, Gyeonggi-do (KR)

(73) Assignee: AMOSENSE CO., LTD, Chungcheongnam-Do (KR)

( * ) Notice: Subject to any disclaimer, the term of this patent is extended or adjusted under 35 U.S.C. 154(b) by 286 days.

(21) Appl. No.: 16/081,825

(22) PCT Filed: Feb. 28, 2017

(86) PCT No.: PCT/KR2017/002195
§ 371 (c)(1),
(2) Date: Aug. 31, 2018

(87) PCT Pub. No.: WO2017/150884
PCT Pub. Date: Sep. 8, 2017

(65) Prior Publication Data
US 2019/0109482 A1    Apr. 11, 2019

(30) Foreign Application Priority Data
Mar. 2, 2016    (KR) .................. 10-2016-0025291

(51) Int. Cl.
H02J 7/20       (2006.01)
H02J 7/02       (2016.01)
H01M 10/46      (2006.01)
H02J 50/90      (2016.01)
(Continued)

(52) U.S. Cl.
CPC ............. H02J 7/025 (2013.01); H01F 27/36 (2013.01); H01F 38/14 (2013.01); H01M 2/10 (2013.01);
(Continued)

(58) Field of Classification Search
CPC ...................................... H02J 7/025
(Continued)

(56) References Cited

U.S. PATENT DOCUMENTS 8,487,481 B2 *  7/2013  Cook ..................... H01Q 1/248
                                                       307/104
2009/0229327 A1 *  9/2009  Valade, Jr. .......... E05B 73/0052
                                                       70/277
(Continued)

FOREIGN PATENT DOCUMENTS

KR        10-0971737 B1     7/2010
KR      10-2013-0045142 A   5/2013
(Continued)

OTHER PUBLICATIONS

ISA/KR, International Search Report dated Jul. 25, 2017, issued in International Application No. PCT/KR2017/002195, total 4 pages with English translation.

Primary Examiner — Jerry D Robbins
(74) Attorney, Agent, or Firm — Masuvalley & Partners (57) ABSTRACT Provided is an auxiliary battery capable of transmitting and receiving wireless power. The auxiliary battery capable of transmitting and receiving wireless power according to an embodiment of the present invention comprises: a battery; a wireless power transfer antenna which functions as an antenna for transmitting or receiving wireless power and is provided as a single antenna; and a circuit unit for controlling an operation of the wireless power transfer antenna, wherein the single antenna receives wireless power supplied from an external source so as to charge the battery, or wirelessly transmits power stored in the battery so as to charge a battery of the charge target.

15 Claims, 4 Drawing Sheets (51) Int. Cl.
*H02J 50/10* (2016.01)
*H01M 2/10* (2006.01)
*H01F 27/36* (2006.01)
*H02J 50/20* (2016.01)
*H02J 50/70* (2016.01)
*H01F 38/14* (2006.01)
*H01M 10/44* (2006.01)
*H02J 50/12* (2016.01)
*H02J 7/00* (2006.01)

(52) U.S. Cl.
CPC ......... *H01M 10/44* (2013.01); *H01M 10/46* (2013.01); *H02J 50/10* (2016.02); *H02J 50/20* (2016.02); *H02J 50/70* (2016.02); *H02J 50/90* (2016.02); *H02J 7/00* (2013.01); *H02J 50/12* (2016.02)

(58) Field of Classification Search
USPC ....................................................... 320/108
See application file for complete search history.

(56) References Cited

U.S. PATENT DOCUMENTS

| | | | | |
|---|---|---|---|---|
| 2009/0312046 | A1* | 12/2009 | Clevenger | H02J 50/80 455/522 |
| 2010/0084918 | A1* | 4/2010 | Fells | H04B 5/0037 307/32 |
| 2011/0218014 | A1* | 9/2011 | Abu-Qahouq | H02J 50/001 455/522 |
| 2015/0015180 | A1* | 1/2015 | Miller | H02J 7/0042 320/103 |
| 2015/0092360 | A1* | 4/2015 | Stillman | H01M 2/1094 361/749 |

FOREIGN PATENT DOCUMENTS

| | | |
|---|---|---|
| KR | 10-2014-0107040 A | 9/2014 |
| KR | 10-2015-0048013 A | 5/2015 |
| KR | 10-1548277 B1 | 8/2015 |

* cited by examiner

AUXILIARY BATTERY CAPABLE OF TRANSMITTING AND RECEIVING WIRELESS POWER

CROSS REFERENCE TO RELATED APPLICATIONS

This application is the national phase entry of International Application No. PCT/KR2017/002195, filed on Feb. 28, 2017, which is based upon and claims priority to Korean Patent Applications 10-2016-0025291, filed on Mar. 2, 2016. The entire contents of which are incorporated herein by reference.

TECHNICAL FIELD

The present invention relates to an auxiliary battery, and more specifically, to an auxiliary battery capable of transmitting and receiving wireless power, by which a battery of a portable device or the like is charged with wirelessly transmitting power, and the auxiliary battery itself is wirelessly chargeable.

BACKGROUND

In general, in order to charge a portable terminal such as a mobile phone, a notebook, and a personal digital assistant (PDA), the portable terminal has to receive electrical energy (or power) from an external charging device. Such a portable terminal includes a battery cell for storing supplied electrical energy and a circuit for charging and discharging (supplying electrical energy to the portable terminal) the battery cell.

An electrical connection method between a battery cell and a charging device for charging electrical energy into a battery cell may include a terminal supply method in which commercial power is received and converted into a voltage and a current corresponding to the battery cell, and electrical energy having the voltage and the current is supplied to the battery cell through a terminal of the battery cell.

Such a terminal supply method is performed using a physical cable or an electrical wire, and a port for electrically connecting the cable or the electrical wire is essentially involved.

However, since the port is externally exposed, there are risks of intrusion of foreign matters or infiltration of moisture, which causes damage to the terminal so that the service lifetime of the terminal may be shortened.

In addition, a general wired charge/discharge type auxiliary battery is inconvenient to use because the cable requires connection to the port.

SUMMARY OF INVENTION

The present invention is directed to providing an auxiliary battery capable of transmitting and receiving wireless power, by which a battery is charged with wirelessly transmitting power, and the auxiliary battery itself is charged by wirelessly receiving power so that a conventional cable and a conventional port may be removed, thereby improving convenience of use and solving various problems caused by the port.

The present invention is also directed to providing an auxiliary battery capable of transmitting and receiving wireless power, which includes single wireless power transfer antenna that is switched between a wireless power transmission mode and a wireless power reception mode according to the purpose of use thereof, thereby reducing an overall thickness of the auxiliary battery.

One aspect of the present invention provides an auxiliary battery capable of transmitting and receiving wireless power, the auxiliary battery including: a battery; a wireless power transfer antenna which functions as an antenna for transmitting or receiving wireless power and is provided as a single antenna; and a circuit unit configured to control an operation of the wireless power transfer antenna, wherein the single antenna receives wireless power supplied from an external source so as to charge the battery, or wirelessly transmits power stored in the battery so as to charge a battery of a charge target.

A magnetic field shielding sheet formed of a magnetic material may be disposed on one surface of the wireless power transfer antenna to shield a magnetic field such that the magnetic field is focused in a desired direction.

The wireless power transfer antenna may operate in a transmission mode to wirelessly transmit the power stored in the battery.

The wireless power transfer antenna may periodically transmit a power signal to detect a wireless power receiving module.

The power signal may include at least one piece of information on an amount of electric power of the charge target, charge state information, electric power information suitable for a load to be requested, and identification information.

For an example, the circuit unit may maintain the transmission mode of the wireless power transfer antenna when an inductance of the wireless power transfer antenna is changed and no other power signal other than the power signal transmitted from the wireless power transfer antenna is detected. Accordingly, a main battery of the charge target may be charged.

For another example, the circuit unit may switch the wireless power transfer antenna to a reception mode when an inductance of the wireless power transfer antenna is changed and a power signal different from the power signal transmitted from the wireless power transfer antenna is detected. Accordingly, the battery itself may be charged.

The inductance of the wireless power transfer antenna may be changed based on an interaction with a wireless power receiving antenna of the wireless power receiving module included in the charge target or a wireless power transmitting antenna of a wireless power transmitting module included in an external charging device.

The auxiliary battery may include a case having an internal space for accommodating the auxiliary battery capable of transmitting and receiving the wireless power, and the case may be filled therein with a waterproof agent to cover at least one surface of the wireless power transfer antenna.

The waterproof agent may include a resin material containing at least one selected from among silicone resin, epoxy resin, and urethane resin.

A charging port may be provided at one side of the case for electrical connection with the charge target.

A switch may be provided at one side of the case to turn a driving of the circuit unit on or off.

Another aspect of the present invention provides an auxiliary battery capable of transmitting and receiving wireless power, the auxiliary battery including: a battery; one wireless power transfer antenna provided on one side of the battery and usable as a wireless power receiving antenna or a wireless power transmitting antenna; and a circuit unit that switches the wireless power transfer antenna to the wireless power transmitting antenna to implement a wireless power transmission mode when a wireless power receiving module of a charge target approaches the wireless power transfer antenna and switches the wireless power transfer antenna to the wireless power receiving antenna to implement a wireless power reception mode when a wireless power transmitting module approaches the wireless power transfer antenna.

Here, a main battery of the charge target may be charged when the wireless power transmission mode is implemented, and the battery itself may be charged when the wireless power reception mode is implemented.

According to the present invention, since a battery of the charge target can be charged or an auxiliary battery itself can be charged by wirelessly transmitting and receiving the power, the charging/discharging operation can be simply achieved by placing an charge target on the auxiliary battery or by placing the auxiliary battery on a wireless power transmission device without connecting a cable, which is required in the related art, thereby being very convenient to use.

In addition, since a port, which is an essential component in the conventional wired charging and discharging system, can be removed in the auxiliary battery capable of transmitting and receiving the wireless power according to the present invention, the troubles caused by intrusion of foreign matters and infiltration of moisture due to the port can be prevented, thereby extending the service lifetime of the auxiliary battery.

Further, the auxiliary battery capable of transmitting and receiving the wireless power according to the present invention is configured to switch a wireless power reception mode and a wireless power transmission mode using single wireless power transfer antenna, thereby reducing the thickness of the auxiliary battery.

DETAILED DESCRIPTION OF THE INVENTION

Hereinafter, exemplary embodiments of the present invention will be described in detail with reference to the accompanying drawings such that those skilled in the art may easily implement the present invention. The present invention may be implemented in various forms and is not limited to the embodiments described herein. In the drawings, elements that do not relate to the present invention are omitted for clarifying the present invention, and the same reference numerals are assigned to the same or similar components throughout the specification.

An auxiliary battery 100 or 200 capable of transmitting and receiving wireless power according to an embodiment of the present invention charges a main battery of a charge target using power of a battery 120.

The charge target may be in the form of a portable electronic device 10 which is portable and transportable. For example, the portable electronic device may include a portable terminal such as a smart phone, a cellular phone, or the like, and may be in the various forms of electronic device such as a smart watch, a digital camera, a digital multimedia broadcasting (DMB), an e-book, a netbook, a tablet personal computer (PC), a portable computer, an augmented reality (AR) device, and a virtual reality (VR) device.

As shown in FIGS. 1 to 6, the auxiliary battery 100 or 200 capable of transmitting and receiving the wireless power according to the embodiment of the present invention includes a battery 120, a wireless power transfer antenna 130, and a circuit unit 140.

The wireless power transfer antenna 130 may transmit or receive wireless power.

Figure 1:
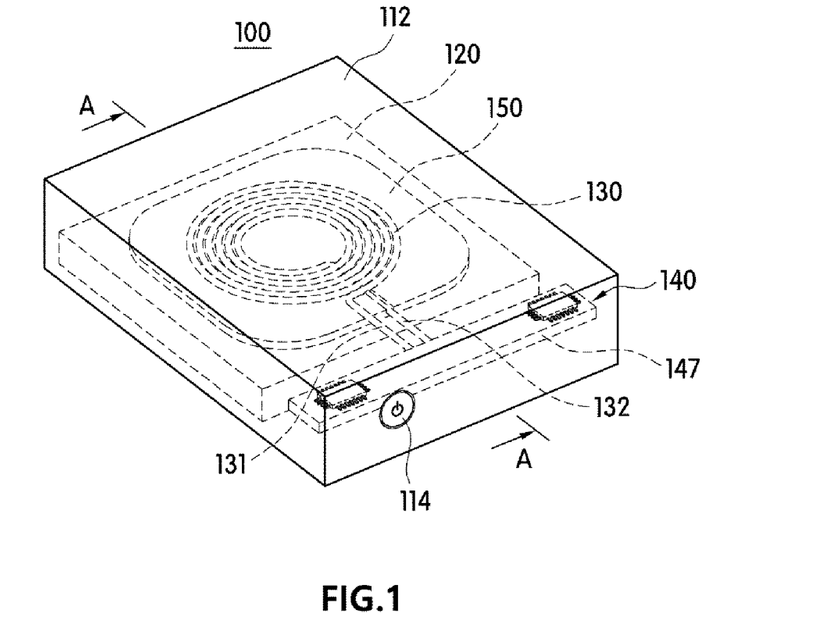
FIG. 1 is a schematic view of an auxiliary battery capable of transmitting and receiving wireless power according to one embodiment of the present invention.
Figure 4:
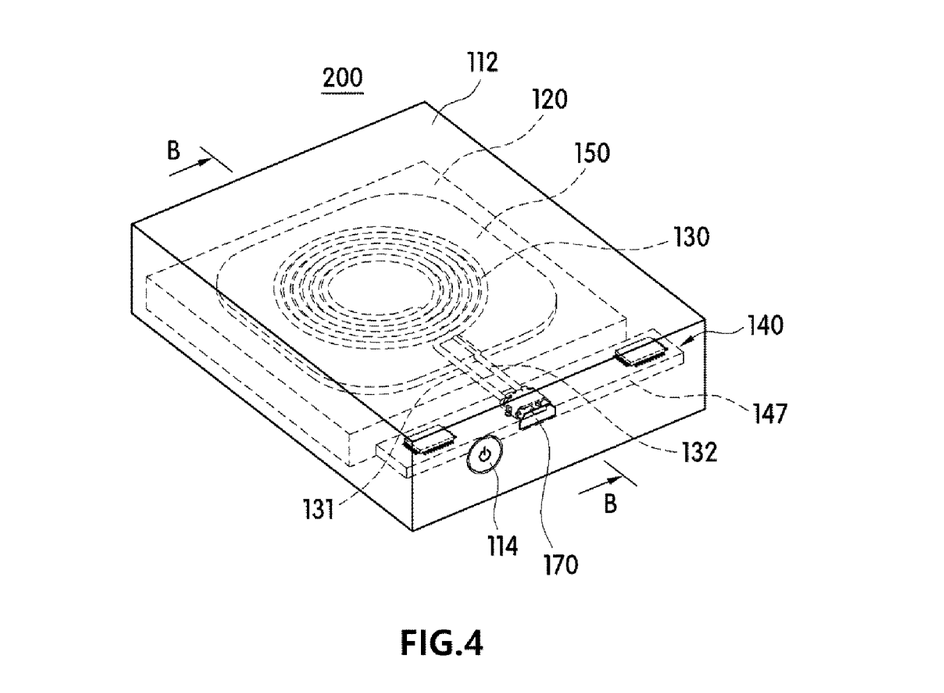
FIG. 4 is a schematic view of an auxiliary battery capable of transmitting and receiving wireless power according to another embodiment of the present invention.

The wireless power transfer antenna 130 may be a flat type coil having a shape including one selected from among circular, elliptical and rectangular shapes and a combination thereof in which a conductive member is wound clockwise or counterclockwise, and connection terminals 131 and 132 provided at both ends of the wireless power transfer antenna 130 may be electrically connected to the circuit unit 140.

The auxiliary battery 100 or 200 capable of transmitting and receiving the wireless power according to the present invention may receive wireless power from an external charging device through one wireless power to charge the battery 120 thereof with the power and may wirelessly transmit the power of battery 120 to charge a main battery of a charge target using one wireless power transfer antenna 130.

That is, the wireless power transfer antenna 130 according to the present invention can perform the function of an antenna for wireless power transmission or can perform the function of an antenna for wireless power reception according to the purpose of use through one antenna.

In other words, the wireless power transfer antenna 130 may be used as a wireless power transmitting antenna that operates in a transmission mode for charging the main battery of the charge target by using the power stored in the battery 120, and may be used as a wireless power receiving antenna that operates in a reception mode for charging the battery 120 by receiving the wireless power supplied from an external charging device.

That is, the wireless power transfer antenna 130 can be switched to the wireless power transmitting antenna to implement a wireless power transmission mode when a charge target having a wireless power receiving module approaches the wireless power transfer antenna 130 and can be switched to the wireless power receiving antenna to implement a wireless power reception mode when a wireless power transmitting module approaches the wireless power transfer antenna 130.

In addition, the wireless power transfer antenna 130 may be switched from the transmission mode, in which the wireless power transfer antenna 130 operates as the wireless power transmitting antenna to charge the main battery of the charge target, to the reception mode, in which the wireless power transfer antenna 130 operates as the wireless power receiving antenna to charge the battery 120 itself.

For example, the wireless power transfer antenna 130 can charge the main battery of the charge target when the charge target including the wireless power receiving module approaches the wireless power transfer antenna 130 in a state in which the wireless power transfer antenna 130 is operated in the transmission mode for transmitting the wireless power (see FIG. 3), and the wireless power transfer antenna 130 can be switched from the transmission mode to the reception mode for charging the battery 120 itself when the charging device including the wireless power transmitting module approaches the wireless power transfer antenna 130.

The power transmission/reception using the wireless power transfer antenna 130 may be achieved through a conventional magnetic induction scheme or a conventional self-resonance scheme in which an electromagnetic field is generated using a coil and power is transmitted through the coil.

The wireless power transfer antenna 130 may be manually switched from the reception mode to the transmission mode or vice versa when a user operates a separate switch (not shown), or the wireless power transfer antenna 130 may be automatically switched from the reception mode to the transmission mode or vice versa by the circuit unit 140.

For example, when the charge target including the wireless power receiving module approaches the auxiliary battery 100 or 200 according to the present invention, the circuit unit 140 can switch the wireless power transfer antenna 130 to the wireless power transmitting antenna. In addition, when the wireless power transmitting module approaches the auxiliary battery 100 or 200 according to the present invention, the circuit unit 140 can switch the wireless power transfer antenna 130 to the wireless power receiving antenna.

In addition, when the external charging device approaches the wireless power transfer antenna 130 in a state in which the wireless power transfer antenna 130 is operated in the transmission mode for charging the main battery of the charge target, the circuit unit 140 can switch from the transmission mode to the reception mode.

Further, when the charge target approaches the wireless power transfer antenna 130 in a state in which the wireless power transfer antenna 130 is operated in the reception mode for charging the battery 120 itself, the circuit unit 140 can switch from the reception mode to the transmission mode.

According to the present invention, the circuit unit 140 may control the operation of the wireless power transfer antenna 130 to receive the wireless power from the outside or to transmit the wireless power to the outside, and may use the power of the battery 120 as a driving power.

When the battery 120 is charged with power, the circuit unit 140 may maintain a driving state until the power charged in the battery 120 is completely drained. Alternatively, the operation can be turned on or off by a user as the user manipulates a switch 114 to allow or block power being supplied from the battery 120.

In detail, when the power is supplied to the circuit unit 140, the wireless power transfer antenna 130 may operate in the transmission mode in which the wireless power transfer antenna 130 functions as the wireless power transmitting antenna, and a power signal for detecting the approach of the wireless power receiving module may be transmitted to the outside through the wireless power transfer antenna 130 at regular intervals by controlling the circuit unit 140.

The power signal may include at least one piece of information on the amount of electric power of the charge target including the wireless power receiving module, charge state information, power information suitable for a load requested by the charge target, and identification information so that at least one of frequency, current and voltage characteristics, which are used for generating a wireless power signal, can be determined.

When an inductance of the wireless power transfer antenna 130 changes during the transmission of the power signal by the wireless power transfer antenna 130, the circuit unit 140 may identify the approach of the charge target including the wireless power receiving module and may adjust the amount of power according to a load required by the wireless power receiving module. Thus, the power stored in the battery 120 may be drained in order to charge the battery of the charge target.

In addition, when the inductance of the wireless power transfer antenna 130 changes and another power signal transmitted from the outside is detected by the circuit unit 140 in a state in which the wireless power transfer antenna 130 operates in the transmission mode as described above so that the power signal for detecting the approach of the wireless power receiving module is transmitted through the wireless power transfer antenna 130 at regular intervals, the circuit unit 140 may identify the approach of the external charging device including the wireless power transmitting module and may switch the wireless power transfer antenna 130 to the reception mode.

Accordingly, the battery 120 itself can be charged by receiving the wireless power transmitted from the wireless power transmitting module of the external charging device through the wireless power transfer antenna 130.

To this end, the circuit unit 140 may include various circuits for operating the wireless power transfer antenna 130 in the reception mode and the transmission mode.

Figure 7:
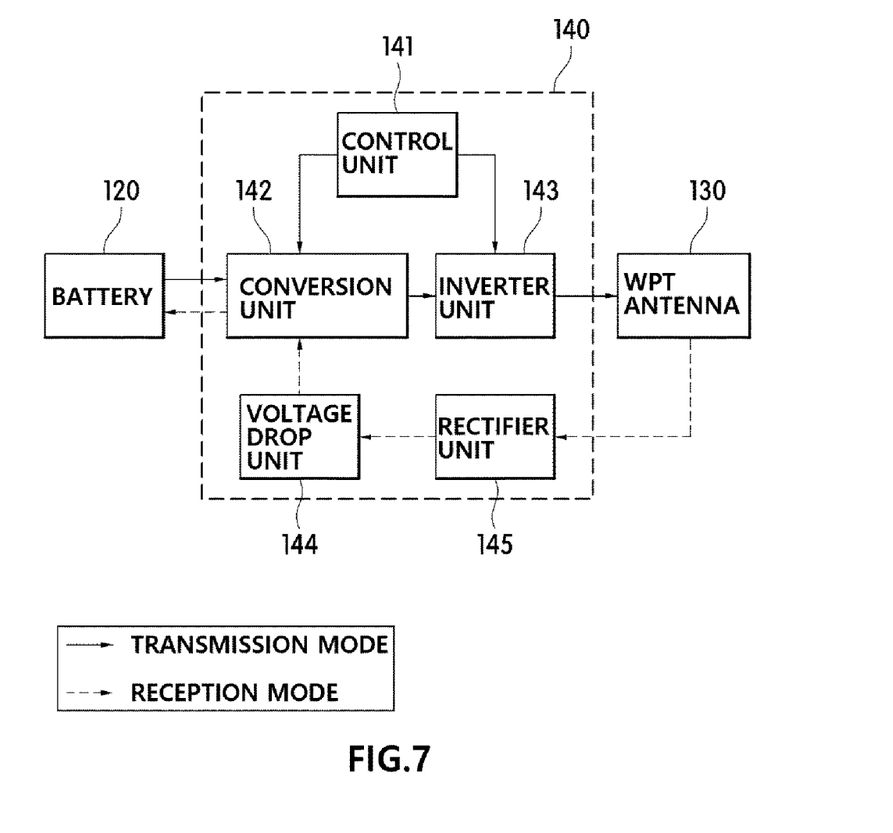
FIG. 7 is a block diagram showing a detailed configuration of a circuit unit applied to an auxiliary battery capable of transmitting and receiving wireless power according to the present invention.

For example, as shown in FIG. 7, the circuit unit 140 may include a control unit 141 that controls the overall operation of the circuit unit 140 and generates a control signal for controlling characteristics of frequency, voltage and current used to generate the power signal transmitted from the wireless power transfer antenna 130.

According to the present invention, the control unit 141 may perform a process of identifying the wireless power receiving module and the wireless power transmitting module according to a result of detecting the presence of the wireless power receiving module and the wireless power transmitting module, may determine whether to initiate the wireless power transfer, and may generate a control signal to switch the wireless power transfer antenna 130 from the transmission mode to the reception mode when the approach of the wireless power transmitting module is detected.

In addition, the circuit unit 140 may include a conversion unit 142 that converts power supplied from the battery 120 into a predetermined voltage and a predetermined current or converts power received through the wireless power transfer antenna 130 into a predetermined voltage and a predetermined current suitable for the battery 120 to supply the predetermined voltage and the predetermined current to the battery 120.

Further, the circuit unit 140 may include an inverter unit 143 that converts a DC power supplied from the battery 120 into an AC power, a rectifier unit 145 that converts an external power received through the wireless power transfer antenna 130 from the AC power into the DC power, and a voltage drop unit 144 that converts the DC power converted by the rectifier unit 145 into a voltage suitable for the battery 120.

The control unit 141 may be a micro control unit (MCU) generally known in the art, and a pulse width modulation (PWM) scheme may be applied to the control unit 141. The voltage drop unit 144 may adopt one of a low drop output (LDO) system and a Buck system. Further, the circuit unit 140 may include a protection circuit such as a protection circuit module (PCM) in order to prevent overcharging or to protect various circuits.

In addition, the circuit unit 140 may further include a switching circuit configured to switch the wireless power transfer antenna 130 to perform the function of the wireless power transmitting antenna upon the approach of the wireless power receiving module or to perform the function of the wireless power receiving antenna upon the approach of the wireless power transmitting module.

The circuit unit 140 may include at least one of various circuit patterns formed on a circuit board 147, at least one chipset or diode mounted on the circuit board 147 and various passive elements (e.g., resistors, capacitors, etc.).

Accordingly, the auxiliary battery 100 or 200 capable of transmitting and receiving the wireless power according to the present invention may be operated in the transmission mode for charging the main battery of the charge target by using the power stored in the battery 120 or may be operated in the reception mode for charging the battery 120 by receiving the wireless power supplied from the external charging device under the control of the circuit unit 140.

For example, in a case in which the main battery of the charge target is charged using the auxiliary battery 100 or 200 capable of transmitting and receiving the wireless power according to the present invention, when the power is supplied from the battery 120 to the circuit unit 140, the wireless power transfer antenna 130 can be operated in the transmission mode by transmitting the power signal generated from the control unit 141 to the outside at regular intervals.

The power being supplied to the circuit unit 140 may be allowed or blocked through the manipulation of the switch 114 by the user. In addition, the power supplied from the battery 120 may be converted into a predetermined voltage and a predetermined current through the conversion unit 142 and then supplied to the control unit 141. Then, DC power is converted into AC power by the inverter unit 143 and the AC power is supplied to the wireless power transfer antenna 130, thereby transmitting the power signal to the outside at regular intervals.

Thereafter, when the inductance of the wireless power transmission battery 130, which is operated in the transmission mode, changes through the interaction with the wireless power receiving antenna of the wireless power receiving module included in the charge target in a process of transmitting the power signal by the wireless power transfer antenna 130, the circuit unit 140 may identify the approach of the charge target requiring the charging of the battery and may adjust the amount of power according to a load required by the wireless power receiving module of the charge target. Thus, the power stored in the battery 120 can be drained in order to charge the battery of the charge target.

Meanwhile, when the battery 120 itself needs to be charged, the charging device including the wireless power transmitting module is brought close to the auxiliary battery 100 or 200 capable of transmitting and receiving the wireless power according to the present invention, thereby charging the battery 120 wirelessly.

That is, when the charging device approaches the wireless power transfer antenna 130 in a state in which the auxiliary battery 100 or 200 capable of transmitting and receiving the wireless power according to the present invention operates in the transmission mode in which the power signal is transmitted through the wireless power transfer antenna 130 at regular intervals, the inductance of the wireless power transfer antenna 130 operating in the transmission mode may be changed by interaction with the transmitting antenna of the wireless power transmitting module included in the charging device. In addition, when the control unit 141 detects another power signal transmitted from the charging device, the control unit 141 may identify the approach of the charging device and may block the power supplied to the inverter unit 143. Thus, the wireless power transfer antenna 130 may be operated as the wireless power receiving antenna and may be switched to the reception mode for charging the battery 120 itself.

The control unit 141 may provide information including at least one piece of information on the amount of power of the battery 120, charge state information, power information suitable for the load requested by the charge target, and identification information to the charging device.

Accordingly, the wireless power provided from the charging device is received through the wireless power transfer antenna 130 in a state suitable for the battery 120, and then supplied to the battery 120, thereby charging the battery 120 with the power.

The power received through the wireless power transfer antenna 130 may be converted from AC power to DC power through the rectifier unit 145 and converted into a voltage suitable for the battery 120 by the voltage drop unit 144. In addition, a predetermined voltage and a predetermined current may be provided by the conversion unit 142 so that the battery 120 can be charged.

As described above, the auxiliary battery 100 or 200 capable of transmitting and receiving the wireless power according to the present invention can charge the battery of the charge target or charge the auxiliary battery itself by wirelessly receiving and transmitting the power so that a process of connecting cables, which is required in the related art, can be removed and the charging/discharging operation can be simply achieved by placing the charge target on the auxiliary battery or by placing the auxiliary battery on the external charging device, thereby being very convenient to use.

In addition, since a port, which is an essential component in the conventional wired charging/discharging system, can be removed in the auxiliary battery, the troubles caused by intrusion of foreign matters and infiltration of moisture due to the port can be prevented, thereby extending the service life of the auxiliary battery.

Meanwhile, in the auxiliary battery 100 or 200 capable of transmitting and receiving the wireless power according to the present invention, the battery 120 and the circuit unit 140 may be accommodated in a case 110 to protect the battery 120 and the circuit unit 140 from the external environment and to improve the portability of the auxiliary battery.

For example, the case 110 may be provided in a box shape with an internal space for accommodating the battery 120, the wireless power transfer antenna 130, and the circuit unit 140, and may be formed of a rigid material such as plastic or a metal.

The case 110 may be configured to have at least one horizontal surface. One surface of the charge target may come into contact with the horizontal surface, or one surface of the charging device for charging the battery may come into contact with the horizontal surface for a steady charging operation so that the charging operation can be smoothly carried out. The charging device may be a charging pad which is generally known in the art.

In addition, the switch 114 electrically connected to the circuit unit 140 may be provided on one side of the case 110 and a user can manipulate the switch 114 to supply power to the circuit unit 140 or to block power being supplied to the circuit unit 140.

Further, a display unit (not shown) may be provided at one side of the case 110 to display the remaining amount of the battery 120 accommodated in the case 110 or to display the on/off state of the circuit unit 140.

Figure 5:
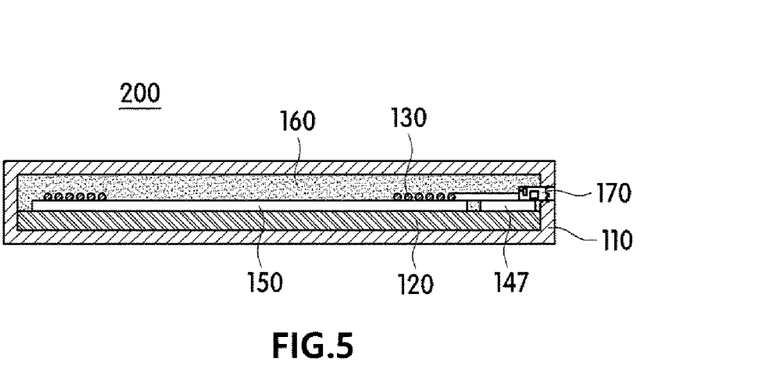
FIG. 5 is a sectional view taken along line B-B of FIG. 4.
Figure 6:
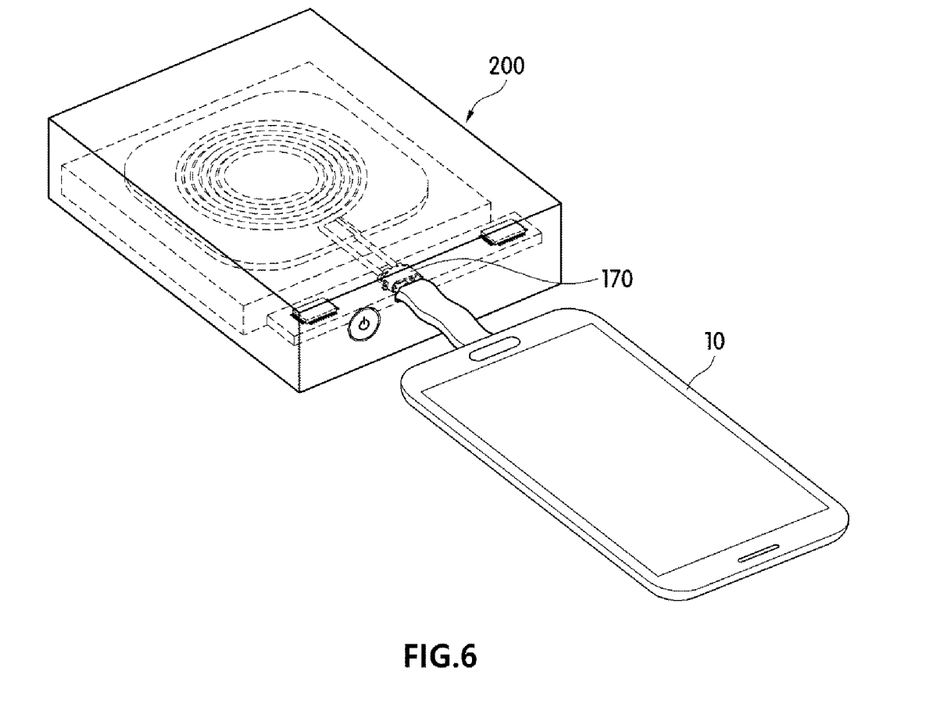
FIG. 6 is a schematic view illustrating a state in which a portable electronic device is charged in a wired manner using an auxiliary battery capable of transmitting and receiving wireless power according to another embodiment of the present invention.

Meanwhile, as shown in FIGS. 4 to 6, the auxiliary battery 200 capable of transmitting and receiving the wireless power according to the present invention may include a charging port 170 provided at one side of the case 110 and electrically connected to the circuit unit 140.

The charging port 170 is used for electrical connection with the charge target such as a portable electronic device. That is, as shown in FIG. 6, the charging port 170 is connected to the portable electronic device through a conventional charging cable in a wired manner, thereby charging a main battery of the portable electronic device in a wired manner.

Accordingly, the auxiliary battery 200 capable of transmitting and receiving the wireless power according to the present invention can wirelessly charge the battery 120 itself through the wireless power transfer antenna 130, and can simultaneously charge the main battery of the portable electronic device connected through a cable in a wired manner by using the power of the battery 120.

Therefore, according to the auxiliary battery 200 capable of transmitting and receiving the wireless power of the present invention, a position of the portable electronic device connected through the cable can be freely changed in the process of simultaneously charging the battery 120 and the main battery of the portable electronic device or in the process of charging the main battery of the portable electronic device in a wired manner so that the user can freely use the portable electronic device.

When the auxiliary battery 200 capable of transmitting and receiving the wireless power according to the present invention includes the charging port 170, the circuit unit 140 may include a separate wired charging circuit for wired charging.

Figure 2:
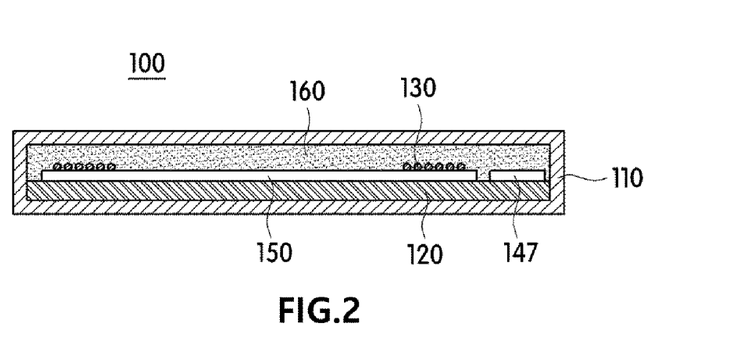
FIG. 2 is a sectional view taken along line A-A of FIG. 1.
Figure 3:
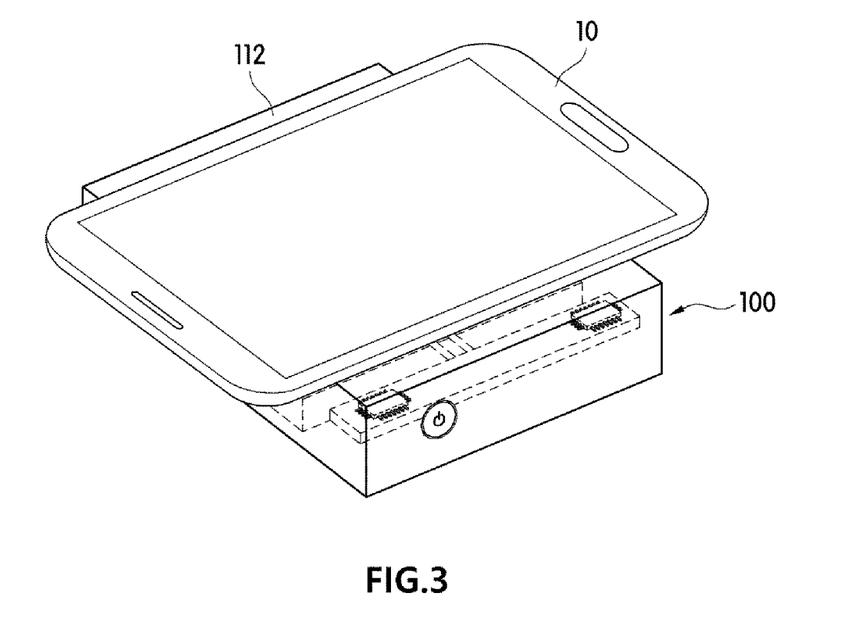
FIG. 3 is view illustrating a state of use of the auxiliary battery capable of transmitting and receiving wireless power according to one embodiment of the present invention.

Meanwhile, when the battery 120, the wireless power transfer antenna 130, and the circuit unit 140 are accommodated in the case 110 in the auxiliary battery 100 or 200 capable of transmitting and receiving the wireless power according to the present invention, the case 110 may be filled with a waterproof agent 160 to cover at least one surface of the wireless power transfer antenna 130 (see FIGS. 2 and 5).

Accordingly, even when moisture infiltrates from the outside, the moisture may not come into contact with electronic components due to the waterproof agent 160 filling the case 110, and thus damage and performance degradation of the electronic components caused by the moisture can be prevented.

For example, the waterproof agent 160 is formed of a resin material containing at least one selected from among silicone resin, epoxy resin, and urethane resin to protect the circuit unit 140 and the wireless power transfer antenna 130 from the moisture. However, the present invention is not limited to the waterproof agent 160, and various types of conventional waterproof agents 160 can be used.

The auxiliary battery 100 or 200 capable of transmitting and receiving the wireless power according to the present invention may include a magnetic field shielding sheet 150 to increase the transmission efficiency of the wireless power transfer antenna 130. The magnetic field shielding sheet 150 may be disposed on one side of the wireless power transfer antenna 130.

The magnetic field shielding sheet 150 may be formed of a material having a magnetic property so as to shield the magnetic field generated by the wireless power transfer antenna 130 such that the magnetic field can be focused in a desired direction.

The magnetic field shielding sheet 150 may be formed of various materials generally known in the art. For example, the magnetic field shielding sheet may include a ribbon sheet including at least one of an amorphous alloy and a nanocrystalline alloy, a ferrite sheet, a polymer sheet or the like.

In addition, the magnetic field shielding sheet 150 may be flaked and divided into a plurality of pieces, or may have a multilayer structure. Since the magnetic field shielding sheet 150 has a known structure, a detailed description thereof will be omitted, and various types of shielding sheets generally known in the art can be used as the magnetic field shielding sheet.

While the present invention has been particularly shown and described with reference to the exemplary embodiments thereof, it is to be understood that the present invention is not limited to the disclosed exemplary embodiments, but other embodiments may be easily suggested by adding, changing, deleting, or modifying the components within the scope of the present invention.

The invention claimed is:

1. An auxiliary battery which allows wireless power to be transmitted and received, the auxiliary battery comprising:
a battery;
a wireless power transfer antenna which functions as an antenna for transmitting or receiving wireless power and providing as a single antenna; and
a circuit unit configured to control an operation of the wireless power transfer antenna,
wherein the single antenna receives wireless power supplied from an external source so as to charge the battery, or wirelessly transmits power stored in the battery so as to charge a battery of a charge target based on an inductance change of the wireless power transfer antenna and detection of a power signal.

2. The auxiliary battery of claim 1, wherein a magnetic field shielding sheet formed of a magnetic material is disposed on one surface of the wireless power transfer antenna to shield a magnetic field such that the magnetic field is focused in a desired direction.

3. The auxiliary battery of claim 1, wherein the wireless power transfer antenna operates in a transmission mode to wirelessly transmit the power stored in the battery.

4. The auxiliary battery of claim 3, wherein the wireless power transfer antenna periodically transmits the power signal to detect a wireless power receiving module.

5. The auxiliary battery of claim 4, wherein the power signal includes at least one piece of information on an amount of electric power of the charge target, charge state information, electric power information suitable for a load to be requested, and identification information.

6. The auxiliary battery of claim 4, wherein the circuit unit maintains the transmission mode of the wireless power transfer antenna when the inductance of the wireless power transfer antenna is changed and no other power signal other than the power signal transmitted from the wireless power transfer antenna is detected.

7. The auxiliary battery of claim 4, wherein the circuit unit switches the wireless power transfer antenna to a reception mode when the inductance of the wireless power transfer antenna is changed and a power signal different from the power signal transmitted from the wireless power transfer antenna is detected.

8. The auxiliary battery of claim 6, wherein the inductance of the wireless power transfer antenna is changed based on an interaction with a wireless power receiving antenna of the wireless power receiving module included in the charge target or a wireless power transmitting antenna of a wireless power transmitting module included in an external charging device.

9. The auxiliary battery of claim 7, wherein the inductance of the wireless power transfer antenna is changed based on an interaction with a wireless power receiving antenna of the wireless power receiving module included in the charge target or a wireless power transmitting antenna of a wireless power transmitting module included in an external charging device.

10. The auxiliary battery of claim 1, comprising a case having an internal space for accommodating the auxiliary battery which allows wireless power to be transmitted and received, wherein the case is filled therein with a waterproof agent to cover at least one surface of the wireless power transfer antenna.

11. The auxiliary battery of claim 10, wherein the waterproof agent includes a resin material containing at least one selected from among silicone resin, epoxy resin, and urethane resin.

12. The auxiliary battery of claim 10, wherein a charging port is provided at one side of the case for electrical connection with the charge target.

13. The auxiliary battery of claim 10, wherein a switch is provided at one side of the case to turn a driving of the circuit unit on or off.

14. An auxiliary battery which allows wireless power to be transmitted and received,
the auxiliary battery comprising:
a battery;
one wireless power transfer antenna provided on one side of the battery and usable as a wireless power receiving antenna or a wireless power transmitting antenna; and
a circuit unit that switches the wireless power transfer antenna to the wireless power transmitting antenna to implement a wireless power transmission mode when a wireless power receiving module of a charge target approaches the wireless power transfer antenna and switches the wireless power transfer antenna to the wireless power receiving antenna to implement a wireless power reception mode when a wireless power transmitting module approaches the wireless power transfer antenna;
wherein the circuit unit switches the wireless power transfer antenna to the wireless power receiving antenna or the wireless power transmitting antenna based on an inductance change of the wireless power transfer antenna and detection of a power signal.

15. The auxiliary battery of claim 14, wherein a main battery of the charge target is charged when the wireless power transmission mode is implemented, and the battery itself is charged when the wireless power reception mode is implemented.

* * * * *